C. CALDWELL & W. P. KOPPE.
COTTON HARVESTER.
APPLICATION FILED APR. 26, 1913.
1,239,767.
Patented Sept. 11, 1917.
3 SHEETS—SHEET 1.
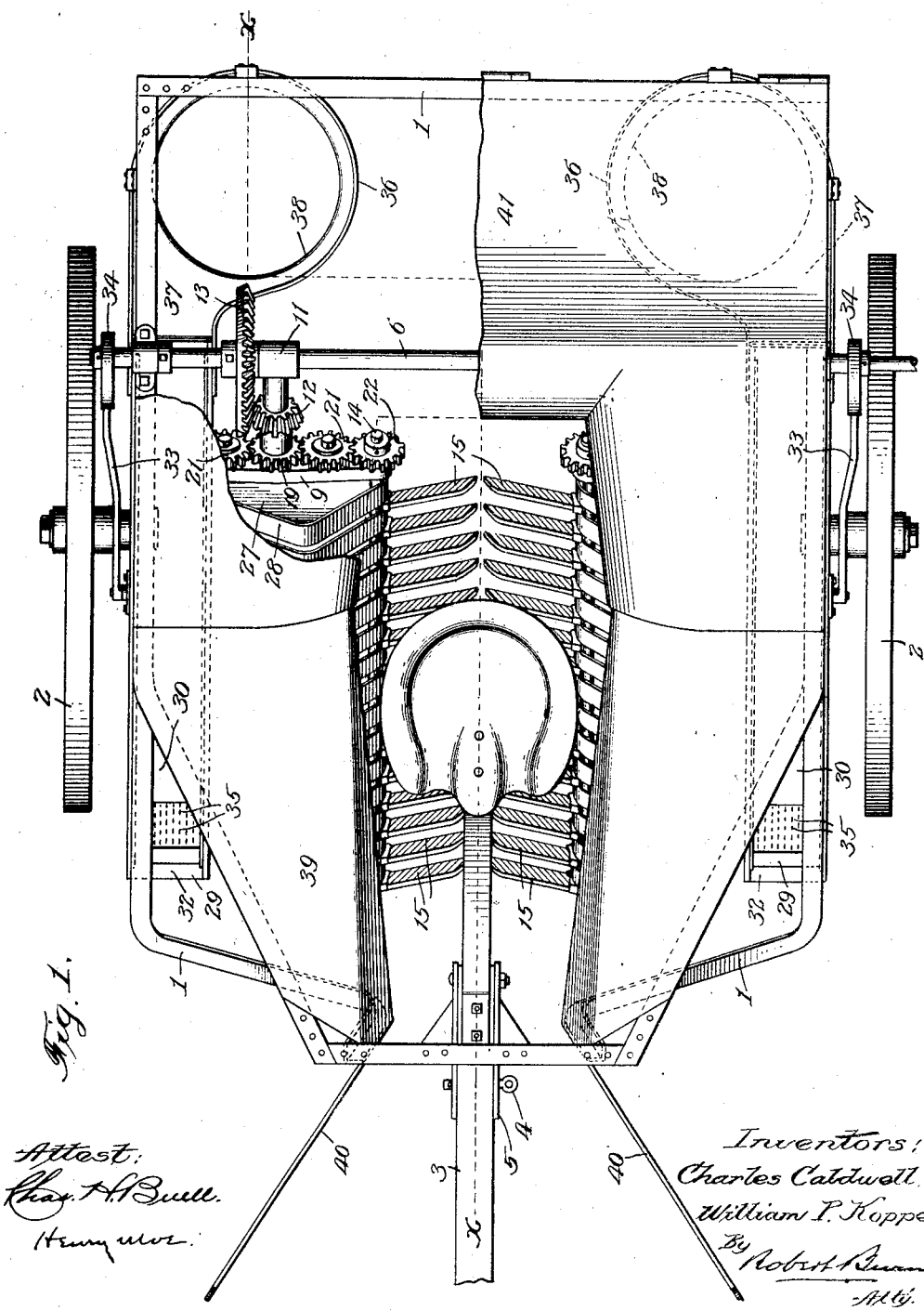

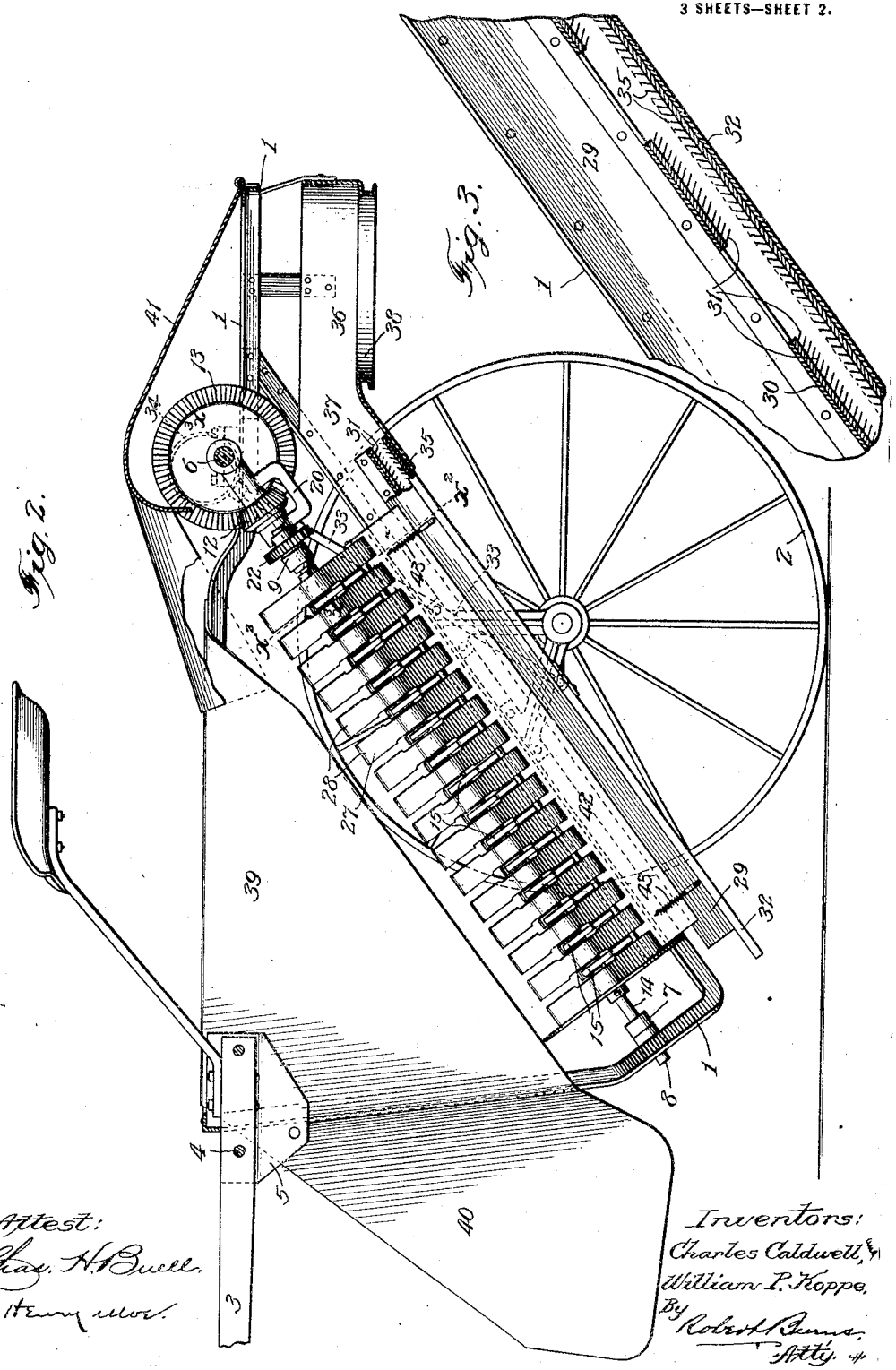

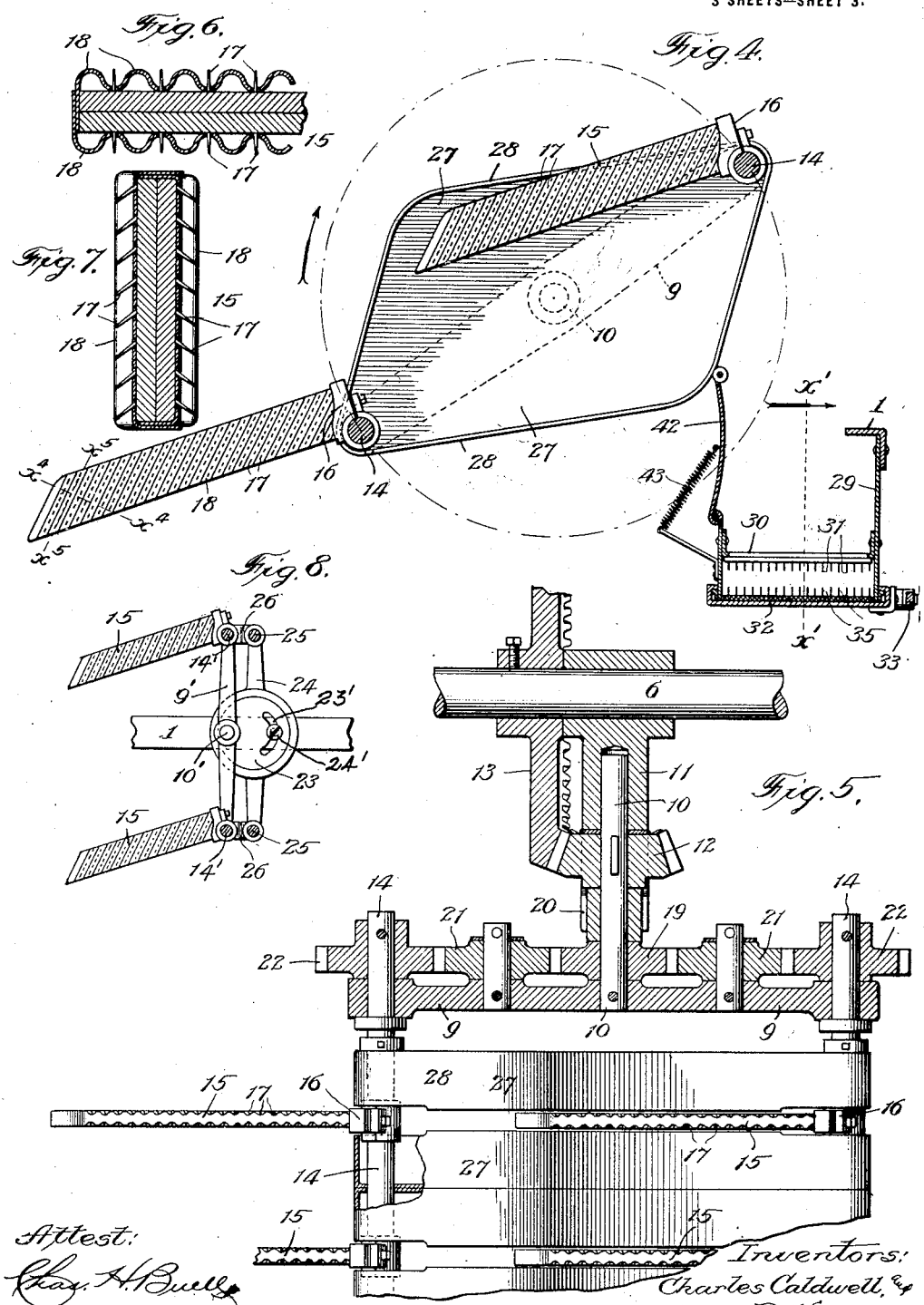
C. CALDWELL & W. P. KOPPE.
COTTON HARVESTER.
APPLICATION FILED APR. 26, 1913.
1,239,767.
Patented Sept. 11, 1917.
3 SHEETS—SHEET 3.

UNITED STATES PATENT OFFICE.

CHARLES CALDWELL AND WILLIAM P. KOPPE, OF CHICAGO, ILLINOIS, ASSIGNORS, BY DIRECT AND MESNE ASSIGNMENTS, TO DEERE AND COMPANY, OF MOLINE, ILLINOIS.

COTTON-HARVESTER.

1,239,767.  Specification of Letters Patent.  Patented Sept. 11, 1917.

Application filed April 26, 1913. Serial No. 763,717.

*To all whom it may concern:*

Be it known that we, CHARLES CALDWELL and WILLIAM P. KOPPE, citizens of the United States of America, and residents of Chicago, in the county of Cook, State of Illinois, have invented certain new and useful Improvements in Cotton-Harvesters, of which the following is a specification.

This invention relates to cotton harvesters and has for its objects among other things the following:

To provide flat picker blades;

To provide means whereby the picker, whatever its form, may be carried bodily upwardly through the plant;

To provide a mechanism whereby such picker may be given an orbital movement upwardly through the plant;

To keep the pickers in substantially the same and substantially a horizontal plane;

To provide a movable dumping stripper;

To associate such pickers with such strippers and to provide various other improvements in structure and methods of operation as more fully hereinafter set forth.

We have illustrated our invention in a form which is substantially a working apparatus, but a more extended experience with the structure may lead to various modifications. We wish it understood that the drawings are to be taken in a sense as diagrammatic and intended to illustrate broadly the ideas rather than to specifically set forth the details of a form of structure which will contain our invention.

In the accompanying drawings:

Figure 1, is a plan view, with portions of the housings broken away, of a two wheeled cotton harvester embodying the present invention.

Fig. 2, is a longitudinal section of the same on line $x$—$x$, Fig. 1.

Fig. 3, is an enlarged detail section on line $x'$—$x'$, Fig. 4, of one of the conveyer mechanisms of the present invention.

Fig. 4, is an enlarged fragmentary transverse section on line $x^2$—$x^2$, Fig. 2, illustrating the arrangement of the picker blades and accessories in the present invention.

Fig. 5, is a detail sectional plan view on line $x^3$—$x^3$, Fig. 2, illustrating one form of the driving mechanism of one set of the picker blades.

Fig. 6, is an enlarged detail section on line $x^4$—$x^4$, Fig. 4, of a picker blade.

Fig. 7, is a similar view on line $x^5$—$x^5$, Fig. 4, of said blade.

Fig. 8, is a detail transverse section, illustrating a modified form of the driving mechanism of a set of picker blades.

Similar reference numerals indicate like parts in the several views.

Referring to the drawings, 1 represents the main frame of the harvester, said frame comprising the usual top portion disposed in an elevated position so as to pass freely over the row of plants from which the cotton is to be picked, and a pair of side depending portions adapted to support the hereinafter described picker, stripper and conveyer mechanisms of the present invention. As usual in the present type of apparatus the frame 1 will be supported by a pair of wheels 2 journaled on individual axles carried by the aforesaid side portions of the main frame, as shown.

3 is the draft tongue of the harvester, pivoted centrally to the top portion of the main frame 1 and extending forwardly for the attachment of the double-tree and other parts by which a pair of draft animals are hitched to the harvester.

4 is a transverse locking pin passing through an orifice in the draft tongue 3 at a point forward of its pivotal connection to the main frame 1, and through one or the other of a pair of vertically separated holes in the clevis plate 5 secured to the main frame, to lock the parts at the desired adjustment. With such construction and with the locking pin 4 in engagement with the orifice of the tongue 3 and with the uppermost hole of the clevis 5, the parts will be coupled in the working position of the harvester illustrated in Fig. 2, while with said locking pin in engagement with the orifice of the tongue 3, and with the lowermost hole of the clevis 5, the forward end of the main frame 1, and the parts carried thereby will have an elevated position above the ground, in order that the harvester may be hauled to and from the field without damage from ordinary ground obstructions or irregularities.

6 is the main driving shaft of the apparatus, disposed transversely and journaled in suitable bearings on the top portion of the main frame 1. The driving shaft may receive motion in the usual well known manner.

In the preferred form of the present invention as shown in the drawings, two counterpart sets of picker mechanisms are carried at the respective sides of the main frame 1, and in positions inclined upwardly from the front of the harvester. The picker mechanisms are disposed in opposed relation so that in actual use the picker blades will be projected into and toward the center of the cotton plant from each side as the same is straddled by the main frame 1. In detail each picker mechanism will comprise a formation and combination of parts as follows:

7 is a lower cross-head having a central hub portion which carries a shaft 8, by which the cross-head is journaled on the main frame 1, while at its outer ends said cross-head is formed with bearings for the hereinafter described shafts of the picker blades.

9 is a companion upper cross-head having a central hub portion which carries a shaft 10 by which said cross-head is journaled in the bracket 11, which in turn is carried by the main driving shaft 6 aforesaid. At its outer ends said cross-head 9 is formed with journal bearings for the carrying shafts of the picker blades above referred to.

12 is a bevel gear wheel carried by the shaft 10 of the upper cross-head 9, and 13 is a bevel gear wheel secured to the main driving shaft 6, and having driving engagement with the gear 12, to impart rotation to the same and to the cross-head 9.

14, 14 indicate a pair of counterpart carrying shafts to which the hereinafter described series of picker blades 15 are fixedly secured. Said shafts have journal bearings in the lower and in the upper cross-heads 7 and 9, as shown in Fig. 2, the general construction of cross-head 9 being illustrated more particularly in Figs. 2 and 5, and are adapted to connect said cross-heads together in their proper separated relation, so that said cross-heads and carrying shafts will constitute a rectangular carrying frame having revolution around a central axis.

15 indicates flat picker blades and which are secured in spaced relation on the aforesaid carrying shafts by end attaching sleeves 16, as illustrated in Fig. 4. In the preferred construction illustrated in Figs. 6 and 7, each picker blade 15 consists of a pair of flat inner strips of leather or the like, arranged back to back, to which are attached a plurality of diagonally disposed straight rows of picker teeth or spines 17, and an inclosing housing 18 of corrugated sheet metal. In the described construction apertures are formed at the base of each corrugation for the passage of the aforesaid picker teeth or spines 17, which in the present construction do not project beyond the crown of the adjacent corrugations, as illustrated in Figs. 6 and 7. The described arrangement is adapted to guard the picker teeth 17 from engagement with anything but the ripe cotton of the cotton plant, which owing to its elastic nature will readily pass between the ridges of the aforesaid corrugations into picking engagement with the picker teeth 17, while the leaves and other hard portions of the cotton plant are deflected away from a like picking engagement.

19 is a central gear wheel associated with the upper cross-head 9 aforesaid, and held against rotation by an arm or extension 20 of the bracket 11 above described, or by any other ordinary connection which will prevent rotation.

21, 21 indicate counterpart idler gear wheels, journaled on the upper cross-head 9 and having driven engagement with the fixed central gear wheel 19 aforesaid.

22, 22 indicate counterpart gear wheels, individual to the carrying shafts 14 of the picker blades, and keyed or otherwise secured to said shafts. Said gear wheels 22 mesh with and are driven by the idler gear wheels 21, aforesaid.

The function of the above described series of gear wheels, 19, 21 and 22, is to maintain the series of picker blades 15, in an approximately horizontal condition during their entire orbital movements around the axis of their carrying means, in that in the revolution of the cross-head 9, around its axis, the idler gear wheels 21 in an orbital movement around the fixed central gear wheel 19 acquire rotation around their individual axes in the same directions as the aforesaid orbital movement. As such rotation is in turn imparted to the gear wheels 22 of the carrying shafts 14, in an opposite direction, said shafts will receive a single rotation in a reverse direction around their individual axis, while they are making a single orbital revolution around the axis of the aforesaid cross-head 9. As a result the picker blades 15 carried by the shafts 14 are maintained at all times in the approximately horizontal positions at which they were initially secured to said carrying shafts 14.

As the above described function of the series of gears 19, 21 and 22, is well known in the arts, and notably in feathering paddle wheels, the scope of the present invention embraces the substitution of said gears, of any other well known mechanical movement adapted to effect the same function, and to this end we illustrate in Fig. 8 one modifications for attaining the same results, and in which:

9' is a cross-head corresponding with the cross-head 9 before described, which cross-head 9' supports carrying shafts 14' for a series of picker blades 15, as shown.

23 is an eccentric secured against rotation by attachment to the main frame 1, and disposed in adjacent relation to the carrying shaft 10' of the cross-head 9' aforesaid.

24 is a cross-head having a central yoke portion engaging the eccentric 23, aforesaid, and a pair of oppositely extending arms disposed in parallel relation to the similar arms of the cross-head 9'. In the described construction, each picker blade 15 has pivotal connection with the longitudinal shafts 14' and 25 carried at the outer ends of the cross-heads 9' and 24, by means of attaching eye bars 26, as shown. With the described arrangement the two cross-heads 9' and 24 have rotary movement in individual paths disposed eccentrically to each other, and the eye bars 26, by which they are connected together impose uniform movement on said cross-heads, and maintain the picker blades, carried by said eye bars, in the approximately horizontal positions, at which they were initially arranged, and during the entire revolution of the parts around the axes of the cross-heads.

The eccentric 23 shown in Fig. 8 is provided with an arcuate slot 23' which receives a screw or pin 24', the latter screwing into the main frame 1; the eccentric 23 being adapted to swing about the point 10', and the amount of rotation or movement controlled by the extent of the slot 23'. From the construction shown it is evident that when the eccentric is swung downwardly in Fig. 8 so as to bring the pin 24' at the upper end of the slot, the cross-head 24 will be shifted downward relative to cross-head 9', and by reason of the eye-attaching bars 26 will cause the picker blades 15 to be elevated. Reverse movement of the eccentric 23 will cause a reverse movement of the picker blades.

27 are the stripper blades by which the picked cotton is removed from the picker blades 15, during the normal orbital travel of said blades in their circular paths. In the preferred construction, shown more especially in Figs. 4 and 5, said stripper blades are of an approximately diamond form and provided with eyes at their respective acute corners for supporting engagement with the carrying shafts 14 of the picker blades 15. Said stripper blades are disposed between the series of picker blades 15 and in alternated relation therewith as shown, and have flanges 28 at their margins in order to present wide stripping faces or edges, so that in their association with the properly spaced picker blades, they will have adjacent relation to the picker teeth 17 of said picker blades 15.

With the above described arrangement of parts, the picker blades 15 will pass between the stripper blades 27, for a removal of the picked cotton, in a direction opposite to that in which said picker blade moved through the cotton plant to pick the cotton, and as a result the picked cotton is readily dislodged from the picker teeth 17, and is free to move downward by gravity in the conveyers now to be described.

29 are a plurality of open top conveyer troughs secured to the sides of the main frame 1, in an inclined position corresponding with that of the picker and stripper mechanisms heretofore described, and in adjacent relation to the outer sides of said mechanisms so as to receive the cotton as the same is dropped by the stripping mechanisms in their normal revolutions. In the present construction each conveyer trough will comprise a detail construction and arrangement of parts as follows:

30 is a fixed partition disposed a distance above the lower edge of a trough 29 aforesaid, to divide the same into an upper cotton receiving portion and a lower cotton conveyer portion or chute. Said partition 30 is formed with a plurality of apertures along its length for the passage of the cotton into said conveyer portion or chute, and in addition said partition is provided with a series of fixed reflex teeth or spines 31 on its under surface and intermediate of the apertures in said partition.

32 is the bottom member of the trough, slidingly secured thereto as shown, and adapted to receive a reciprocating movement with relation to the body of the trough, through an eccentric rod 33, and an operating eccentric 34, secured to the main driving shaft 6, before described.

35 are a series of reflex teeth or spines carried on the upper surface of the bottom member 32 aforesaid, and disposed with the inclination in a direction the reverse of the before described series of fixed reflex teeth 31. With the described construction of parts, the teeth 35 in their movement in an inclined and upward direction are adapted to push the cotton in the conveyer chute in an upward direction, and said cotton is in turn held from any retrograde downward movement by the fixed teeth 31, and while the aforesaid teeth 35 are making a reverse movement. Accordingly the cotton will be moved through the conveyer chute aforesaid in an intermittent manner, to be finally discharged into the receiver now to be described.

36 are enlarged receivers secured to the side portions of the main frame 1, near the rear of the same, and connected to the rear and upper ends of the above described conveyer chutes by horizontal extensions 37 of said chutes, as illustrated in Fig. 2. At bottom said receivers 36 are formed with large openings, the margins of which are provided with depending flanged necks 38, to which bags adapted to receive the cotton may be readily secured and removed, as required during the practical operation of the harvester.

39 are counterpart sheet metal housings secured in separated relation to the forward portion of the main frame 1, and inclosing the twin picker mechanisms and their accessories above described. The inner and opposed vertical walls of said housings 39 constitute a narrow central longitudinal passage adapted to embrace the row of cotton plants which are being harvested, and hold said plants in proper position while being acted on by the picker blades.

40 are deflector plates disposed at the forward ends of the aforesaid housings 39 and adapted to direct the cotton plants into the above described central passage between the housings.

41, is a supplementary housing attached to the rear end of the main frame, and adapted to provide a cover for the mechanisms and other parts of the harvester, which are mounted on the rear portion of the main frame 1.

42, are deflector boards hinged at their lower edges to the inner and upper edges of the conveyer troughs 29 before described, while their free upper ends are adapted to have bearing on the undersides of the stripper blades 27, and follow the irregular configuration of the same, under the influence of springs 43, or other equivalent means. Said deflector boards are intended to insure the delivery of all the cotton from the stripper blades 27, into the conveyer troughs 29, aforesaid.

The use and operation of my invention are as follows:

When the harvester is to be transported in an inoperative position, the forward end of the harvester may be lifted and locked in position as indicated, but when it is to be used for harvesting, the parts will assume the position shown in Fig. 2. If now, the machine be moved forward in such position as to straddle a row of cotton plants, the movement of the main wheel will impart motion to the shaft 6, and this in turn will cause the rotation of the two separate picker and stripper mechanisms in the direction indicated by the arrow in Fig. 4. Since the parts are so arranged that the pickers will always assume a position something like that shown in Fig. 4, that is, substantially in the same plane and substantially in a horizontal plane, the lower pickers will be advanced toward the cotton plants, and at the lower part thereof or near the ground they are preferably arranged so as to approach each other closely or they might easily be arranged to overlap if desired. In that event, however, they should be arranged in practically vertical planes, whereas in the construction here shown they are slightly inclined.

When the picker blades are inclined as shown, they tend to rise up from beneath their upper surfaces contacting the cotton. They move bodily upwardly through the plant, both of their surfaces engaging the cotton and drawing it out, and when they rise to their highest position, which will be when a given shaft is near the upper part of the circle indicated in Fig. 4, they will begin to retreat or descend, but this action will cause them to pass between the stripper blades which rotate with them, and this will strip the cotton from the blades and deposit it upon the upper portions of the rotating strippers, which in turn will dump it into the conveyer below. Of course, any kind of a conveyer could be used. The one here illustrated is a convenient and effective form.

Our picker is a flat picker blade with guarded teeth, set at an inclination to the vertical and associated with a mechanism which moves it bodily upwardly without rotation on its own axis and imparts to it an inward and outward motion with reference to the vertical plane of the row of plants.

Our stripper is a device through the openings in which the pickers are moved in a direction opposite to the direction of their travel through the plant so that the fibers of cotton will tend to be easily detached from the picker blades, and the stripper is also a cotton dumping device which tends to dump the collected cotton at one side into the cotton elevator.

Having thus fully described our said invention what we claim as new and desire to secure by Letters Patent is:

1. In a cotton harvester, the combination of a main frame, a revoluble carrier mounted on said frame, means for imparting rotation to said carrier, picker blades mounted in series on different portions of said carrier and disposed toward the same side of the carrier, means for maintaining the direction in which said picker blades are disposed relative to said carrier during their travel around the axis of said carrier, said last means comprising a central fixed gear wheel, an idler gear wheel journaled on the carrier and meshing with the fixed gear wheel, and a gear wheel carried by the portion on which the picker blades are mounted and meshing with said idler gear wheel, and means for stripping the picked cotton from the picker blades.

2. In a cotton harvester, the combination of a main frame, a revoluble carrier mounted on said frame, means for imparting rotation to said carrier, picker blades connected to opposite sides of said carrier and disposed toward the same side of said carrier, means for maintaining the direction in which said picker blades are disposed relative to said carrier during the travel of the blades around the axis of said carrier, said means comprising a central fixed gear wheel, a pair of shafts to which the picker blades are secured, a pair of idler gear wheels journaled on the carrier and meshing with the fixed gear wheel and a pair of gear wheels carried by said shaft and meshing with the idler gear wheels, and means for stripping the picked cotton from the picker blades.

3. In a cotton harvester, the combination of a main frame, a revoluble carrier mounted on said frame, means for imparting rotation to said carrier, picker blades pivotally connected to opposite portions of said carrier and disposed toward the same side thereof, means for maintaining the direction in which said picker blades are disposed relative to said carrier during their travel around the axis of said carrier, and means for stripping the picked cotton from the picker blades, the same comprising stripper plates arranged intermediate of the blades at opposite sides of the carrier and supported by the latter.

4. In a cotton harvester, the combination of a main frame, a revoluble carrier mounted on said frame, means for imparting rotation to said carrier, picker blades pivotally connected to opposite portions of said carrier and disposed toward the same side thereof, means for maintaining the direction in which said picker blades are disposed relative to said carrier during the travel of said blades around the axis of said carrier, and means for stripping the picked cotton from the picker blades, the same comprising stripper plates extending between opposite sides of said carrier and supported thereby, said plates having an approximately diamond form and arrangement intermediate of the picker blades.

5. In a cotton harvester, the combination of a main frame, a revoluble carrier comprising a pair of cross-heads journaled to the main frame and a pair of carrying shafts journaled in the outer ends of said cross-heads, means for imparting rotation to said carrier, a plurality of picker blades secured to the aforesaid carrying shafts so as to be disposed toward the same side of said carrier, means associated with said carrying shafts for maintaining the direction of the picker blades relative to said carrier during their orbital travel around the axis of the carrier, and means for removing the picked cotton from the picker blades.

6. In a cotton harvester, the combination of a main frame, a revoluble carrier comprising a pair of cross-heads journaled to the main frame and a pair of carrying shafts journaled in the outer ends of said cross-heads, means for imparting rotation to said carrier, a plurality of picker blades fixed on the aforesaid carrying shafts and disposed toward the same side of the carrier, means associated with said carrier shafts for maintaining the direction of the picker blades relative to said carrier during the orbital travel of the blades around the axis of the carrier, the same comprising a central fixed gear wheel, a pair of idler gear wheels journaled on the carrier and meshing with the fixed gear wheel, and a pair of gear wheels fixed on the carrying shafts aforesaid and meshing with the idler gear wheels, and means for stripping the picked cotton from the picker blades.

7. In a cotton harvester, the combination of a main frame, a revoluble carrier comprising a pair of cross-heads journaled to the main frame and a pair of carrying shafts journaled in the outer ends of said cross-heads, means for imparting rotation to said carrier, a plurality of picker blades fixed on the aforesaid carrying shafts and disposed toward the same side of the carrier, means associated with said carrier shafts for maintaining the direction of the picker blades relative to said carrier during the orbital travel of the blades around the axis of the carrier, and means for removing the picked cotton from the picker blades, the same comprising stripper plates extending between the adjacent blades and between the carrying shafts aforesaid and supported thereby.

8. In a cotton harvester, the combination of a main frame, a revoluble carrier comprising a pair of cross-heads journaled to the main frame and a pair of carrying shafts journaled in the outer ends of said cross-heads, means for imparting rotation to said carrier, a plurality of picker blades fixed on the aforesaid carrying shafts so as to extend toward the same side of the carrier, means associated with said carrying shafts for maintaining the direction of said picker blades relative to the carrier during the orbital travel of the blades around the axis of the carrier, and means for removing the picked cotton from the picker blades, the same comprising stripper plates extending between the carrying shafts aforesaid and supported thereby, said plates having an approximately diamond form and arranged between adjacent picker blades.

9. In a cotton harvester, a picker blade having a flat form, and means for imparting an orbital movement to said blade while the same is held in a laterally disposed direction during such orbital movement, said blade carrying series of diagonally disposed rows of picker teeth and a corrugated face plate with the crowns of the corrugations of said plate arranged between diagonal rows of the picker teeth.

10. A picker blade for cotton harvesters, comprising a laterally extending and vertically disposed blade provided with teeth arranged in diagonal rows on the side of said blade, in combination with means whereby said blade is moved in a reciprocatory manner relative to the plants and maintained substantially horizontal throughout its travel.

11. A picker blade for cotton harvesters, comprising a laterally extending and vertically disposed flat sided body provided with inclined teeth arranged in diagonal rows on both sides thereof, in combination with means whereby said blade is moved in a reciprocatory manner toward and away from the plants and maintained substantially horizontal throughout its travel.

12. A picker blade for cotton harvesters, comprising a laterally extending and vertically disposed flat body provided with teeth arranged in continuous diagonal rows on the flat sides of said body and with raised portions, having rounded upper surfaces substantially level with the free ends or tips of the teeth, arranged between the diagonal rows.

13. A cotton harvester, provided with picker blades arranged in series on an incline and adapted to rotate about a common axis, and means whereby the blades are maintained in an approximately horizontal position throughout their rotation about said axis and given reciprocatory movement relative to the plants.

14. A cotton harvester having flat-sided picker blades arranged in inclined series, the flat sides being provided with teeth arranged in diagonal rows, with smooth raised surfaces between the rows, and means whereby the series of blades are given reciprocatory movement relative to the plants and the respective blades constantly maintained in an approximately horizontal position.

15. A cotton harvester, comprising a series of picker blades arranged on an incline and adapted to be rotated about a common axis, strippers adapted to rotate about said axis and arranged between the picker blades, and means whereby the picker blades are given movement independently of the strippers so as to alternately move beyond and then within the orbit described by the strippers.

16. A cotton harvester, comprising revoluble means, picker blades carried by said means and provided with series of teeth, and means whereby the picker blades are maintained substantially horizontal and held against rotation on their axes so as to provide a reciprocatory movement.

17. A cotton harvester, comprising revoluble means, picker blades carried by said means and provided with flat surfaces having series of teeth, and means operable by said revoluble means whereby the picker blades are maintained substantially horizontal and held against rotation on their axes so as to provide a reciprocatory movement.

18. A cotton harvester, comprising revoluble means, picker blades carried by said means and provided with flat surfaces having rows of teeth and smooth raised surfaces between the rows of teeth, and means whereby the picker blades are maintained substantially horizontal and held against rotation on their axes so as to provide reciprocatory movement.

19. A cotton harvester, comprising a revoluble shaft provided with transversely extending means, picker blades mounted on the outer or free ends of said means, and means operable by said shaft whereby the picker blades are maintained substantially horizontal and held against rotation on their axes so as to provide a reciprocatory movement.

20. A cotton harvester comprising a series of pickers arranged on an incline and means for moving them upwardly through the branches of the cotton plant at different points vertically therealong, and strippers through which said pickers pass in a direction opposite to that along which they move when passing through the branches of the plant.

21. A cotton harvester comprising a series of pickers arranged on an incline, means for maintaining the pickers in substantially horizontal position and cause the same to move bodily upwardly through the branches of the cotton plant at different points vertically therealong, and strippers through which said pickers pass in a direction opposite to that along which they move when passing through the branches of the plant.

22. A cotton harvester comprising a series of pickers arranged on an incline, means for moving them bodily upwardly through the branches of the cotton plant at different points vertically therealong, a portion of said means being adapted to maintain each of said pickers in substantially horizontal position during said movement, and strippers through which said pickers pass in a direction opposite to that along which they move when passing through the branches of the plant, said strippers being mounted on said means and thereby caused to have a shearing relation with the pickers on the downward movement of the latter and cause the dumping of the cotton which the strippers collect from the pickers.

23. A cotton harvester, comprising a carrier-frame adapted to rotate, picker blades mounted in series at opposite sides of said frame, strippers extending from side to side of said frame and arranged to rotate therewith, and means whereby the blades will be maintained substantially horizontal and disposed in the same direction throughout rotation of the frame so as to alternately extend within the circuitous path of said strippers and thereby cause said strippers and picker blades to have shearing relation to each other.

24. A cotton harvester, comprising a rotatably mounted carrier, picker blades mounted in series at opposite sides of the carrier, and means whereby said blades are maintained in substantially horizontal position with their free ends presented in the same direction, the relation between said means and the carrier being such that rotation of the carrier will give the blades a reciprocatory movement through a vertically disposed orbit.

25. A cotton harvester, comprising rotatable means, picker blades carried by said means, and means for imparting an orbital movement to said blade and for maintaining the same in approximately horizontal position throughout said movement.

26. A cotton harvester, comprising power-imparting mechanism, carrier-means, picker blades carried by said means, and means for imparting movement to said carrier-means and an orbital movement to said blades and to maintain the latter in approximately horizontal position throughout said movement.

27. A cotton harvester, comprising a carrier-frame adapted to rotate, picker blades mounted at opposite sides of said frame, stripper elements extending about said carrier-frame intermediate of the blades and arranged to rotate therewith and adapted to extend across the path of said blades, and means whereby the direction in which said blades are presented relative to the axis of said carrier-frame and stripper-elements is maintained during movement of said blades about said axis and the blades, made to pass between said elements in a direction opposite to that in which said blades are moved through the cotton plant.

28. A cotton harvester, comprising a carrier-frame adapted to rotate, picker blades mounted at opposite sides of said frame, stripper elements extending intermediate of the blades about said carrier-frame and secured to the opposite side of said frame so as to rotate therewith, the portion of said elements intermediate of the sides of the frame being adapted to extend into a path beyond that of the blades during movement of said blades through their circuitous path away from the plant, and means actuated by rotation of said carrier-frame whereby the blades are constantly maintained substantially horizontal throughout rotation of the frame and caused to pass within said stripper-elements in a direction opposite to that in which said blades move through the plant.

29. A cotton harvester, comprising a carrier-frame, means whereby said frame is rotated, picker blades mounted at opposite sides of said frame, stripper-elements extending about the frame and secured to opposite sides thereof so as to rotate therewith, and means intermediate of the frame-rotating means and the picker blades whereby the latter are maintained in substantial horizontal position throughout the rotation of the carrier-frame and independent movement given the blades relative to the stripper-elements whereby a sweeping and stripping relation between the blades and the stripper-elements is induced.

Signed at Chicago, Illinois, this 24th day of April, 1913.

CHARLES CALDWELL.
WILLIAM P. KOPPE.

Witnesses:
ROBERT BURNS,
FRANK B. TODD.

Copies of this patent may be obtained for five cents each, by addressing the "Commissioner of Patents, Washington, D. C."